United States Patent [19]

Lindsey

[11] 4,236,142
[45] Nov. 25, 1980

[54] EXCESSIVE SPEED AND THEFT DETERRENT SYSTEM

[76] Inventor: Albert Lindsey, 10240 SW. 105 St., Miami, Fla. 33156

[21] Appl. No.: 872,553

[22] Filed: Jan. 26, 1978

Related U.S. Application Data

[63] Continuation-in-part of Ser. No. 649,736, Jan. 16, 1976, abandoned, which is a continuation of Ser. No. 426,197, Dec. 19, 1973, abandoned.

[51] Int. Cl.² .................... B60Q 1/54; B60R 25/10; G01D 9/00; G06M 1/22
[52] U.S. Cl. .................................. 340/62; 180/287; 307/10 AT; 235/92 T; 324/161; 340/64; 346/18
[58] Field of Search ............... 340/52 R, 52 F, 53, 340/62, 63, 64, 104, 107, 670; 307/10 AT; 235/92 MT, 92 T, 92 AE, 92 TC, 92 EA, 92 CT; 180/105 E, 106, 109, 114; 73/498, 507, 510, 513; 324/161, 178, 179, 180; 346/17, 18

[56] References Cited

U.S. PATENT DOCUMENTS

| | | | |
|---|---|---|---|
| 1,720,230 | 7/1929 | Murray | 340/64 |
| 2,650,987 | 9/1953 | Doyle | 307/10 AT |
| 2,892,181 | 6/1959 | Benson et al. | 340/64 |
| 2,935,730 | 5/1960 | Procter | 340/64 |
| 3,203,501 | 8/1965 | Carter et al. | 180/82.1 |
| 3,206,116 | 9/1965 | Short | 346/18 X |
| 3,422,398 | 1/1969 | Rubin | 340/63 |
| 3,541,505 | 11/1970 | Lee | 340/64 |
| 3,597,730 | 8/1971 | McClellan, Sr. et al. | 340/62 |
| 3,675,199 | 7/1972 | Jamison et al. | 340/62 |
| 3,686,628 | 8/1972 | Keller et al. | 180/106 |
| 3,708,750 | 1/1973 | Bucks et al. | 324/178 |
| 3,710,246 | 1/1973 | Herring | 324/162 |
| 3,748,641 | 7/1973 | Hartung | 340/53 |
| 3,771,122 | 11/1973 | Sattler | 340/62 |
| 3,983,534 | 9/1976 | Goodman | 340/63 |
| 4,093,939 | 6/1978 | Mitchell | 340/52 F |

*Primary Examiner*—John W. Caldwell, Sr.
*Assistant Examiner*—Joseph E. Nowicki
*Attorney, Agent, or Firm*—Cushman, Darby & Cushman

[57] ABSTRACT

An excessive speed and theft deterrent system wherein a signal is generated having a magnitude which is proportional to the speed of the vehicle. A comparator generates an output signal when the magnitude of the generated signal is greater than a preselected voltage level. In response to the output signal, a pulse train is generated having a predetermined pulse rate wherein the pulse train is counted to thereby indicate a total time in which the vehicle is operated at speeds exceeding a predetermined speed. The system also includes sounding devices for generating a warning signal when a door or the ignition system is operated without authorization.

1 Claim, 2 Drawing Figures

EXCESSIVE SPEED AND THEFT DETERRENT SYSTEM

BACKGROUND OF THE INVENTION

This is a continuation-in-part of copending U.S. patent application Ser. No. 649,736, filed Jan. 16, 1976, which in turn is a continuation of U.S. patent application Ser. No. 426,197, filed Dec. 19, 1973, both now abandoned. The subject matter of these applications are incorporated herein by reference thereto.

This invention relates to an improved excessive speed and theft deterrent system for automative vehicles.

With the increased scarcity of fuel recently experienced, it has become increasingly critical that motor vehicles, such as automobiles, trucks and buses, be operated at their most efficient speed level. To achieve this vehicle operators have been asked to maintain preselected speed limits by state and local governments either on a mandatory basis or on a voluntary basis. However, a vehicle operator often does not pay close attention to the speed with which he is driving and indeed may be less than concerned with the speed of the vehicle. Accordingly, vehicle speed warning systems are becoming increasingly important in order to remind drivers when they approach or exceed the posted speed limit. Further, owners of fleets of vehicles such as the government and certain large businesses have set speed limits at which their vehicles operate most efficiently. However, such fleet owners have no way of determining whether their employees are complying with the speed limits imposed. Thus, these fleet owners must rely upon local law enforcement to regulate the speed with which their vehicles are being operated. Accordingly, there is a need for an apparatus for determining not only when the speed limit is being exceeded but also the amount of time during which a vehicle has been operated above the imposed speed limit. Such an apparatus would give an accurate indication to the vehicle operator of the total amount of time in which the vehicle has been operated over the speed limit in a predetermined unit of time, such as, for example, a day or a week.

In addition, the theft of idling or parked vehicles has become an increasing problem. For example, cars or trucks which are temporarily parked but which are idling are a prime target for those who would wish to illegally appropriate the vehicle. Further, even cars which are parked with the engine off are frequent targets for those who would wish to illegally take and use the vehicle. Accordingly, there is a need for a simple, inexpensive and foolproof apparatus for preventing the theft of parked and/or idling vehicles.

It therefore is an object of this invention to provide an improved excessive speed and theft deterrent system for motor vehicles.

SHORT STATEMENT OF THE INVENTION

Accordingly, this invention relates to an excessive speed and theft deterrent system for motor vehicles which comprises a means for generating a signal having a magnitude which is proportional to the speed of the vehicle. The system includes a means for comparing the signal representing the speed of the vehicle with a voltage which is proportional to a predetermined speed limit. The comparing means provides an output when the speed of the vehicle exceeds the predetermined speed limit which output initiates the generation of a pulse train after a predetermined time delay. The pulse train has a predetermined frequency and is counted in a counter to determine the total time in which the vehicle has exceeded the selected speed limit. The time delay in the generation of the pulse train is to permit temporary increases in speed over the speed limit so that the vehicle can pass slower moving vehicles safely.

A scaling means is provided for varying the relative comparison levels of the speed proportional signal and the voltage which is proportional to the predetermined speed limit to thereby vary the vehicle speed level at which the comparison means provides an output. Thus, for example, when the vehicle is idling next to a curb, the relative comparison level is set so that the comparator provides an output when the speed of the vehicle exceeds a coasting level of, for example, 15 miles per hour. When the vehicle exceeds 15 miles per hour, a relay is energized which disconnects the ignition system and the starting switch and in addition energizes a horn. Thus, if some unauthorized person were to attempt to operate the idling vehicle, the motor would not only be immediately turned off but also the horn would be energized to draw attention to the vehicle.

In an alternate embodiment, a pressure sensitive switch is connected to the gear shift level such that when the gear shift is moved from park to reverse or to one of the forward drive positions, the switch would be closed, thereby causing a relay to be energized which disconnects the ignition system and the starter and energizes the vehicle horn.

A key operated switch positioned externally of the operating compartment of the vehicle is closed or activated when the operator leaves the vehicle. Thus, should the hood, trunk, doors or other automotive components be operated which causes conduction of current from the vehicle battery to, for example, a light, a switch associated with these elements will be closed, thereby connecting the vehicle voltage supply to a relay coil. The relay, when energized, disconnects the ignition system and at the same time energizes a horn or other sound generator to signal that the vehicle has been tampered with. This excessive speed and theft deterrent system is compact and inexpensive and requires very little power drain from the battery system until such time as an attempt is made to illegally appropriate the vehicle.

BRIEF DESCRIPTION OF THE DRAWINGS

Other objects, features and advantages of the present invention will become more fully apparent from the following detailed description, appended claims and accompanying drawings in which:

DETAILED DESCRIPTION OF THE PREFERRED EMBODIMENT

Figure 1:
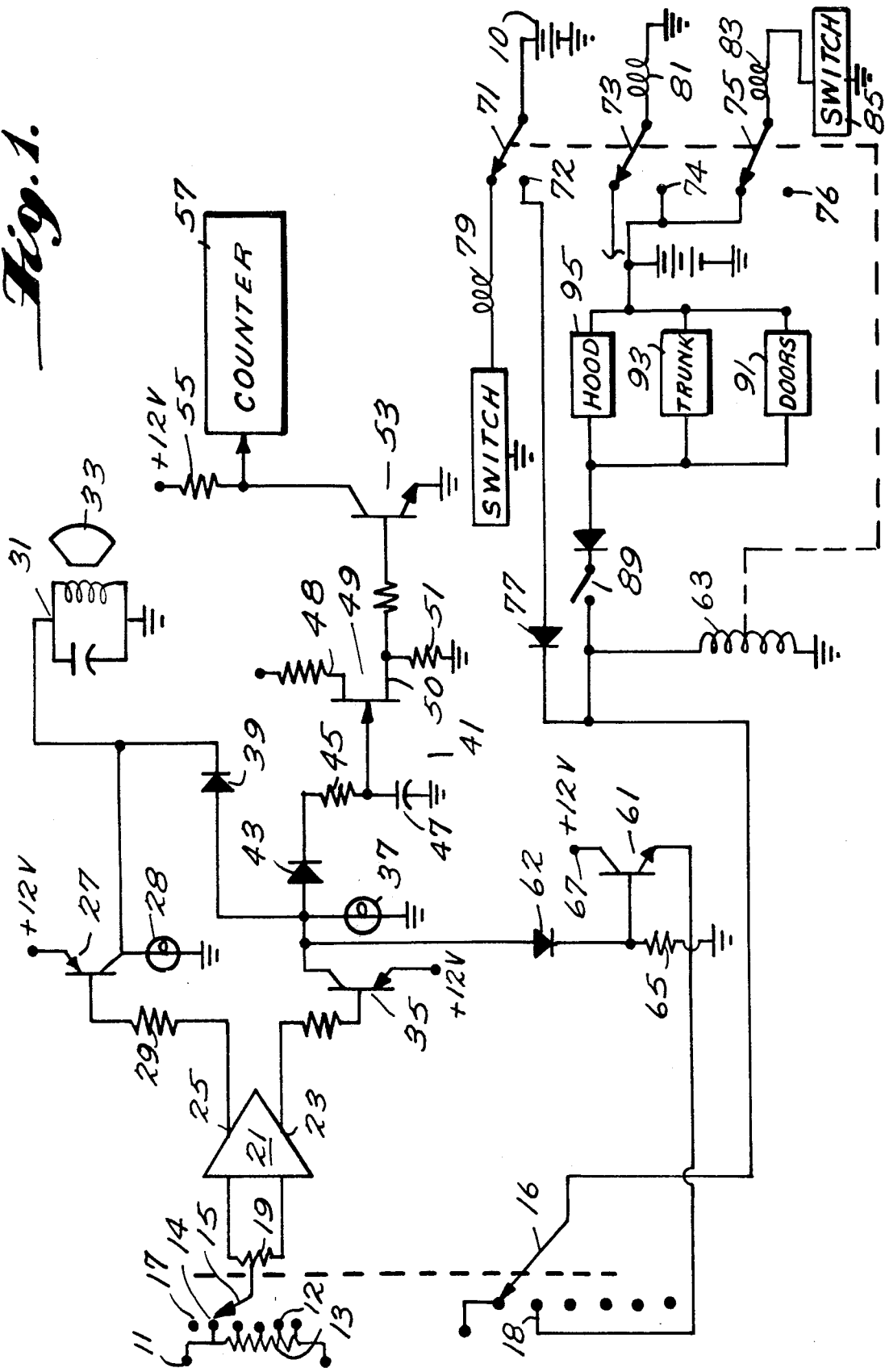
FIG. 1 is a schematic drawing of the preferred embodiment of the present invention.

Refer now to FIG. 1 where there is disclosed a preferred embodiment of the present invention. The output of a tachometer or any other suitable speed detaching device is coupled to the input terminal 11 of a voltage divider 13. The voltage divider has a plurality of output terminals so that the output voltage of the tachometer can be appropriately sealed. A switch arm 15 selectively makes contact with one of the output terminals of the voltage divider or with an off contact 17. The switch 15 is coupled to the midpoint of resistor 19 which has its respective end terminals coupled to the inputs of a differential amplifier 21. The differential amplifier acts as a comparator and provides an output at output terminals 23 and 25 only when the respective input signals thereto exceed a predetermined voltage. Techniques for operating a differential amplifier as a comparator are well known in the art and therefore will not be discussed in detail herein.

The output at terminal 25 of the differential amplifier 21 is coupled to a first transistor 27 via current supply resistor 29. Transistor 27 is of the PNP type and has its emitter terminal connected to a positive source of voltage, such as, the twelve volt supply of the vehicle battery system. The collector of the transistor is connected to ground via a lamp 28. The collector is also connected to an LC oscillator circuit 31. The output of the oscillator circuit drives a transducer, such as, a speaker or horn 33, so that when transistor 27 is turned on, an audible sound is generated which warns the operator that the vehicle is approaching a predetermined speed limit.

The other output terminal 23 of the comparator 21 is coupled to a second transistor 35 which is also of the PNP type. Transistor 35 has its emitter coupled to a positive voltage supply, such as, the twelve-volt supply of the vehicle battery system. The collector of the transistor is connected to a lamp 37 and to the sound driver arrangement 31 via an isolation diode 39. The isolation diode permits current to be conducted from transistor 35 to the LC oscillator circuit 31 but prevents current from transistor 27 from being conducted to the lamp 37.

The collector of transistor 35 is also connected to a timing circuit 41 via an isolation diode 43. Timing circuit 41 includes an RC circuit comprising resistor 45 and capacitor 47. In addition, the timing circuit 41 includes a gating element which in the preferred embodiment is an unijunction transistor 49. As is well known in the art, unijunction transistors have a gate threshold voltage which is dependent upon the voltage across its output base terminals. Thus, when the voltage across the capacitor 47 rises to a predetermined level, the unijunction transistor 49 is gated on, thereby permitting capacitor 47 to discharge through the transistor and resistor 51 to ground. Once the capacitor has become discharged, the unijunction transistor turns off and capacitor 47 again charges. In the preferred embodiment, the resistor 45 and capacitor 47 are chosen such that for a twelve-volt input to resistor 45 via diode 43 the unijunction transitor will be gated once every ten seconds. It should be understood, however, that the rate at which the oscillator 41 generates output pulses can be suitably varied by appropriately changing the values of the resistor 45 and capacitor 47 or by varying the voltage across the base output terminals 48 and 50 of the unijunction transistor 49. The output of the unijunction transistor 49, which appears across resistor 51, is coupled to an output transistor 53 which is of the NPN type. The collector 53 is coupled to the twelve-volt battery supply of the vehicle via a load resistor 55 and to a suitable counter of conventional design. The counter 57 counts the pulses generated by the oscillator circuit 41 to provide an indication of the total time that an output has been provided on line 23 minus, of course, the initial ten second delay.

In operation, assume for example that switch 15 is in contact with terminal 12 of the voltage divider 13. When the vehicle is traveling well below a present speed limit, such as, 60 miles per hour, the voltage appearing at terminal 12 will not be large enough to generate an output from the differential amplifier-comparator 21 at either terminal 23 of 25. Accordingly, neither of the lamps 28 or 37 are energized. However, as the speed of the vehicle approaches within, for example, five miles per hour of 60 miles per hour, that is, the vehicle is traveling at 55 miles per hour, the differential amplifier-comparator 21 will generate a first negative going output at terminal 25. This output turns on transistor 27 and accordingly, lamp 28 is energized as is the sound driver circuit 31. Thus, an audible tone is generated by speaker 33 to indicate to the driver that the vehicle is approaching a predetermined speed limit.

As the speed of the vehicle further increases to the predetermined speed limit, i.e. 60 miles per hour, output 23 of the differential amplifier-comparator 21 goes in the negative direction thereby turning on transistor 35. With transistor 35 turned on, lamp 37 is energized and the sound driver circuit 31 continues to be energized. At the same time capacitor 47 begins to charge through resistor 45 and diode 43. After the capacitor 47 has charged for ten seconds, the voltage across the capacitor is large enough to gate the unijunction transistor 49 so that the capacitor 47 rapidly discharges through the unijunction transistor and resistor 51 to ground. The gating of the unijunction transistor causes output transistor 53 to be turned on, thereby generating a pulse which is counted in counter 57. After capacitor 47 has discharged, unijunction transistor 49 is turned off and the capacitor again charges for a period of ten seconds. The transistor 49 then discharges, thereby generating a second pulse to be counted by counter 57. The oscillator circuit 41 continues to generate output pulses every ten seconds as long as the speed of the vehicle exceeds the preselected speed level. Accordingly, after an initial ten second delay, the counter 57 provides an indication of the total amount of time that the vehicle has exceeded the preselected speed limit. The initial ten second delay is for the purpose of providing time for the vehicle to temporarily exceed the speed limit in a situation where the vehicle must temporarily move rapidly in order to pass another vehicle on a two-lane highway. Since such a rapid acceleration of the vehicle is in the interest of safety so that the passing lane can be quickly opened again to traffic flowing in the opposite direction, the momentary exceeding of the speed limit is not recorded.

When the switch 15 is connected to the lowest possible setting 14 of the voltage divider 13, the output will be generated at terminal 23 when the speed of the vehicle exceeds a predetermined coasting speed of, for example, fifteen miles per hour. With switch 15 connected to terminal 14, a second switch 16 ganged with switch 15 is connected to contact terminal 18. With switch 16 connected to contact terminal 18, the output of transistor 61 is connected to relay coil 63. Thus, when the output terminal 23 of the comparator 21 provides a signal which turns on transistor 35, the base terminal of transistor 61 receives a positive going signal via isolation diode 62. Since transistor 61 is of the PNP type, when current flows from transistor 35 through diode 62 to biasing resistor 65, the transistor is turned on thereby connecting the battery supply voltage at the collector 67 of the transistor to the relay coil 63 via switch and contact 18. With relay coil 63 energized, switch arms 71, 73 and 75 are rotated to make contact with terminals 72, 74 and 76, respectively. Hence the battery supply 10 is coupled via switch arm 71 and switch contact 72 through isolation 77 to the relay 63 to thereby maintain relay 63 energized even when the speed of the vehicle decreases below the coasting speed limit. At the same time, with switch 71 in contact with terminal 72, the ignition system 79 is disconnected from the battery, thereby preventing the engine from operating. At the same time switch arm 73 is disconnected from the horn energizing circuit and connected to the battery voltage to thereby continuously energize the horn 81. Thus, not only is the engine not operating, but also, the horn is sounding on a continuous basis thereby warning others than an attempt has been made to utilize the vehicle without proper authorization. Finally, the starter system 83, which is normally connected to the vehicle batter supply via an ignition switch 85 is disconnected when the relay 63 is energized, thereby preventing the engine from being started when the vehicle exceeds the coasting speed limit. Once relay 63 has been energized, the system continues in the disabled state until switch arms 71, 73 and 75 are rotated manually back to their original position via an appropriate key.

The system of the present invention also includes a theft prevention arrangement which includes a key operated switch 89. The key actuated switch is positioned on the outside of the car in a convenient position such as on one of the fenders of the vehicle. Thus, when the operator of the vehicle parks the vehicle, the key switch 89 is closed by insertion and rotation of a key in the keyhole positioned on the outside of the vehicle. With switch 89 closed, the theft prevention system is ready for operation. Thus, when one of the doors, the trunk or the hood is opened, a switch associated therewith, designated by the numerals 91, 93 and 95, respectively, is closed, thereby connecting the battery supply of the vehicle to the relay 63. Relay 63 is thereby energized to rotate switches 71, 73 and 75 into contact with terminals 72, 74 and 76, respectively. Thus, the horn is sounded to draw attention to the fact that the vehicle has been tampered with and in addition, the ignition system and starter switch are deactivated, thereby preventing the operation of the car. Should the hood, trunk or doors thereafter be closed, the horn 81 will continue to sound and the ignition and starting system will remain deenergized since the battery supply will remain connected to the relay 63 via isolation diode 77 and switch 71.

Figure 2:
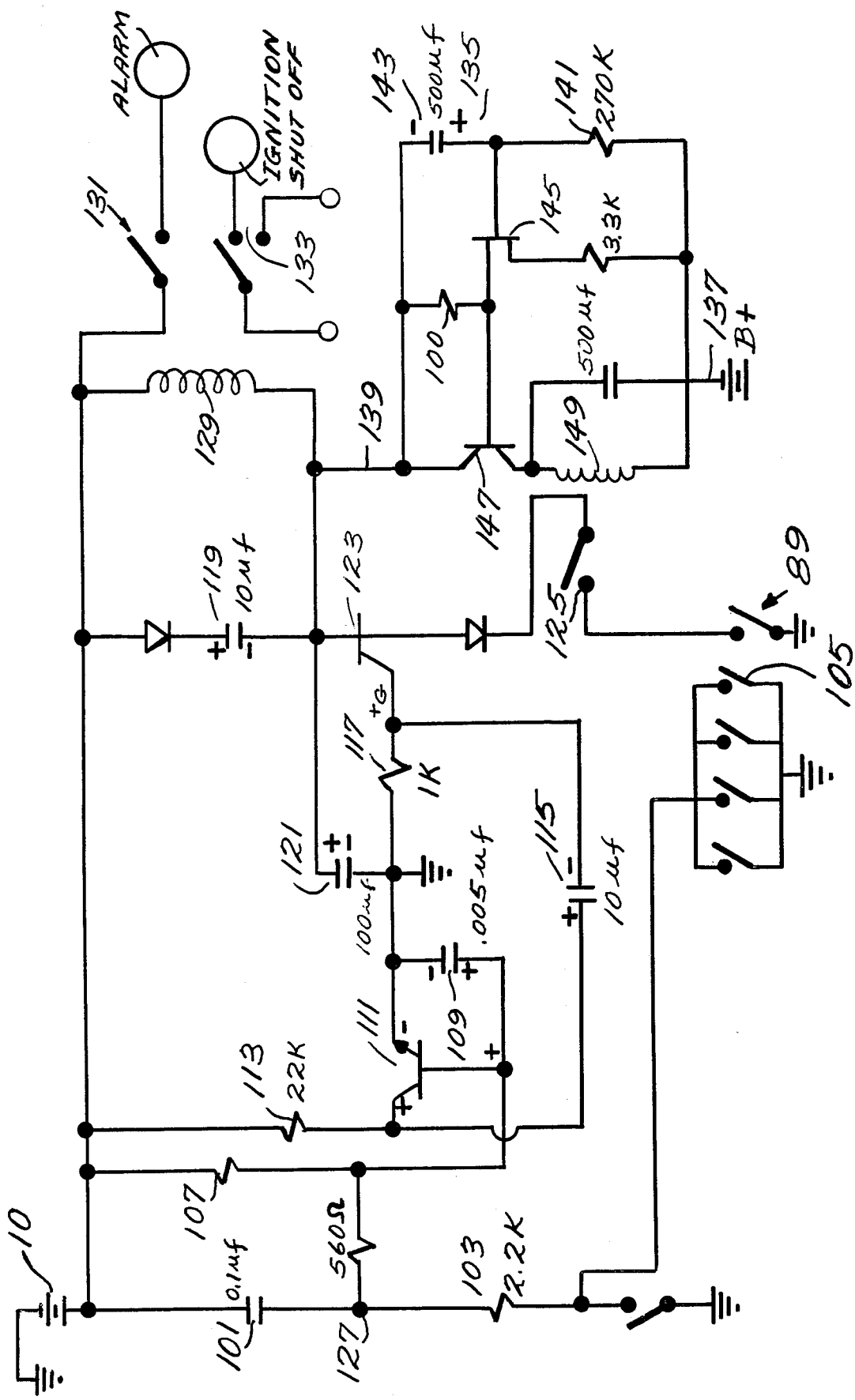
FIG. 2 is a schematic drawing of an alternate embodiment of the present invention.

Refer now to FIG. 2 where there is disclosed a theft prevention system which operates when the vehicle is not operating. A key operated switch 89 is positioned at some location on a car, such as on one of the fenders of the car, such that when the operator of the vehicle parks the vehicle, the key switch 89 is closed by insertion and rotation of a key in the keyhole. With the switch 89 closed, the theft prevention system is ready for operation.

As an initial condition, a source of power, for example, the vehicle battery 10, is connected across a capacitor 101, a resistor 103 and a series of parallel switches 105. The parallel switches are closed when the door, trunk, hood or other vehicle components are opened. Thus, when one of these components are opened, current flows through capacitor 101 and 103 to cause a sequence of events which will be described hereinbelow. The battery 10 is also connected across resistor 107 and capacitor 109 to thereby establish a positive bias across NPN transistor 111. At the same time, the battery is connected across resistor 113, capacitor 115 and resistor 117 to thereby establish a positive bias at the collector of the NPN transistor 111. Thus, under initial operating conditions, transistor 111 is turned on. The battery is also connected across ten $\mu f$ capacitor 119 and 100 $\mu f$ capacitor 121 to thereby establish a voltage division between these two capacitors at the anode of SCR 123. The cathode of the SCR 123 is connected to key switch 89 via normally closed shutoff switch 125. The gate of the SCR 123 is connected to ground via resistor 117 and to one terminal of capacitor 115.

When a door, hood, trunk or other component of the car is operated, switch 105 is closed to thereby connect node 127 to ground via resistor 103. This causes the transistor 111 to turn off to thereby raise the voltage at the collector of transistor 111. This causes current to flow through capacitor 115 and resistor 117 to thereby generate a positive pulse at the gate of SCR 123. SCR 123 is thereby turned on. With SCR 123 turned on, a current flows from the battery 10 through relay coil 129 via SCR 123, normally closed switch 125 and key switch 89 to ground. With relay coil 129 energized, alarm switch 131 is closed to thereby connect the battery to a sound generating alarm, such as, for example, the horn or a siren. Energization of coil 129 also actuates ignition shutoff switch 133 which is connected to the ignition coil such that when closed terminals 4 and 5 the coils are shorted out to prevent the flow of electricity therethrough.

A timing circuit generally designated by the numeral 135 is provided having one terminal 137 connected to the battery supply and the other terminal 139 connected to ground via the SCR switch 123, the normally closed switch 125 and the key switch 89. Thus, when SCR 123 is turned on, current flows from the battery terminal 137 through resistor 141 and capacitor 143 to ground. This causes a positive pulse to appear at the output of the unijunction transistor 145 after a predetermined time period established by the respective values of capacitor 143 and resistor 141. When the positive pulse appears at the output of transistor 145, transistor 147 is turned on to thereby cause current conduction from the battery 10 through relay coil 149, transistor 147 to the SCR 123. With relay coil 149 energized, normally closed switch 125 is opened to thereby interrupt current flow through the SCR 123. Thus, relay coil 129 is deenergized thereby causing switches 131 and 133 to open. At the same time, the timing circuit 135 is deenergized since SCR 123 will be closed or inhibited and the circuit will then return to its normal inoperative condition. The circuit is then automatically set for the next operation which will be caused when both the key 89 is closed and one of the component operating switches 105 is closed.

It should be understood that while the hood, trunk and doors have been described as exemplary elements which generate a theft warning when operated by unauthorized personnel, there can be other elements, such as tires, hub caps, etc., which when tampered with cause a switch 105 to be closed which in turn causes the horn or other sound generating device to be operated so as to warn others that the vehicle has been tampered with by unauthorized personnel.

While the present invention has been disclosed in connection with a preferred embodiment thereof, it should be understood that there may be other obvious variants of the present invention which fall within the spirit and scope of the invention as defined by the appended claims.

What is claimed is:

1. An excessive speed and theft deterrent system for automotive vehicles comprising means for generating a signal having a magnitude which is proportional to the speed of said vehicle, comparator means responsive to said generated speed proportional signal for generating an output signal when the magnitude of said generated speed proportional signal is greater than a preselected voltage level, said preselected voltage level corresponding to a predetermined speed, scaling means for varying the magnitude of said speed proportional signal to thereby vary the speed at which the output of said means for generating a speed proportional signal is equal to said preselected voltage, means responsive to the output signal of said comparator means for generating a pulse train, said pulse train having a predetermined frequency, means for delaying the generation of said pulse train after said comparator means has generated said comparator output signal, means for recording the number of pulses generated by said pulse generating means to thereby indicate to total time in which said vehicle has operated at speeds exceeding said predetermined speed, said comparing means generating a second output signal when the magnitude of said generated speed proportional signal is greater than a second preselected voltage level, said second output signal being generated when the speed of said vehicle approaches said predetermined vehicle speed, and means responsive to said second signal for energizing an indicator when the speed of said vehicle approaches the predetermined vehicle speed level.

* * * * *